United States Patent [19]

Gerety et al.

[11] Patent Number: 4,780,813

[45] Date of Patent: Oct. 25, 1988

[54] DATA TRANSPORT CONTROL APPARATUS

[75] Inventors: Eugene P. Gerety, Wolcott; John A. Yanosy, Jr., Stratford; Jitender K. Vij, Trumbull, all of Conn.

[73] Assignee: ITT Corporation, New York, N.Y.

[21] Appl. No.: 705,457

[22] Filed: Feb. 25, 1985

[51] Int. Cl.[4] .............................................. G06F 13/14
[52] U.S. Cl. .................................................... 364/200
[58] Field of Search ... 364/200 MS File, 900 MS File; 370/94, 85, 88

[56] References Cited

U.S. PATENT DOCUMENTS

| 4,398,246 | 8/1983 | Frediani et al. | 364/200 |
| 4,422,142 | 12/1983 | Inaba et al. | 364/200 |
| 4,449,183 | 5/1984 | Flahive et al. | 364/200 |
| 4,597,078 | 6/1986 | Kempf | 370/94 |
| 4,604,683 | 8/1986 | Russ et al. | 364/200 |

Primary Examiner—Raulfe B. Zache
Assistant Examiner—Michael J. Ure
Attorney, Agent, or Firm—Robert A. Walsh; Thomas N. Twomey; Mary C. Werner

[57] ABSTRACT

A data transport control apparatus including a storage medium independently accessible by a device interface controller for interconnecting the storage medium and peripherals, a communication bus control for interconnecting the storage medium and a communication bus and a microprocessor bus for interconnecting the storage medium and a microcomputer wherein all interconnections to the storage medium are effectively isolated from each other.

10 Claims, 2 Drawing Sheets

1

DATA TRANSPORT CONTROL APPARATUS

CROSS REFERENCE TO RELATED APPLICATIONS

This application is related to one, or more, of the following U.S. patent applications: Ser. No. 670,682, now U.S. Pat. No. 4,644,348; Ser. No. 670,701, now U.S. Pat. No. 4,368,311, both filed on Nov. 13, 1984. Ser. No. 705,456, now abandoned; Ser. No. 705,458, now abandoned; Ser. No. 705,459, now abandoned; Ser. No. 705,460, now U.S. Pat. No. 4,719,617; Ser. No. 705,461, now U.S. Pat. No. 4,677,611; Ser. No. 705,462, now abandoned; Ser. No. 705,463, now abandoned; Ser. No. 705,465, now abandoned; Ser. No. 705,464, now U.S. Pat. No. 4,653,047, all filed on even date therewith. All of the above applications are assigned to the assignee hereof.

BACKGROUND OF THE INVENTION

The present invention generally relates to a data transport control apparatus and, in particular, relates to one such data transport control apparatus having means for minimizing intraapparatus communication.

Throughout present data communication systems, data transport controllers are used which are severely limited in their data traffic handling capabilities and flexibility. Such controllers may, or may not, be in communication with other such controllers. Typically, a data transport controller includes a microprocessor connected to one or more communication peripheral devices, e.g. a synchronous communication controller, and a direct memory access (hereinafter abbreviated DMA) controller. The DMA controller and the communication device are usually connected directly to the bus of the microprocessor.

In order to transmit or receive data on such a system, the communication device is programmed with the information neccessary to effect the transfer, and the DMA controller is programmed with location information about the local source or destination of the data. As the communication device becomes ready to receive or transmit a piece of data, it signals to the DMA controller. In response, the DMA controller makes a request to the microprocessor for temporary control of the bus thereof. When the microprocessor completes its present task use of the bus is granted to the DMA controller which then generates the necessary control and address signals to effect the transfer of the requested piece of data from/to the memory of the microprocessor to/from the communication device.

When the data transfer transaction is completed, which may require the transfer of many pieces of data, an interrupt signal is generated by either the DMA controller or the communication device and presented to the microprocessor to indicate this condition. If, for example, the operation was a transmit operation, nothing more is required until another data transfer. However, if the operation was a receive operation, the microprocessor must, to prevent loss of subsequent data, re-program the DMA controller and the communication device before the next incoming data transfer is initiated. Since the microprocessor has no control as to when data will arrive, the requisite response time thereof is determined by external factors.

Problems can occur in several areas of the aforementioned scenario. For example, when the lengths of the data transfers are short and/or consecutive transfers are closely spaced, the rate of interrupts to the microprocessor can become quite frequent. This reduces the microprocessor's ability to respond, since, for every interrupt, a certain amount of inherent processing is required. Further, because the microprocessor becomes heavily occupied with the immediate problem of a heavy interrupt load, it has less time available for other tasks. In extreme cases, the microprocessor has more interrupts to service than it is able to handle, and is thus no longer able to maintain the receiving devices in a ready state to receive. As a consequence, incoming data is lost. Such a condition is especially true when a large number of communication devices is connected to a single microprocessor. In addition, since the DMA controller steals time away from the microprocessor in order to transfer a piece of data to, or from, the communication device, the time available to the microprocessor for both normal processing and interrupt processing is further diminished by the very act of data transfer. Again, when high transfer rate devices and/or a large number of devices are operating, the microprocessor bus becomes a bottleneck, due to being heavily shared. It is possible for the sum of all bus access requirements to exceed the total bus availability since there are presently no direct mechanisms to prevent same. Finally, because the microprocessor is intimately involved with each and every data transfer operation, the amount of computation, per unit of time, required of the microprocessor can easily exceed the computational capability thereof.

Conventional communication devices are generally specific to a preselected application, and have a command and control format reflecting that specific application. Further, such devices can require frequent, and, in some instances, almost continuous interaction with the microprocessor to effect the transfer of data between its local memory and the communication medium. As a consequence of the application specific nature of such communication devices, it is often necessary to copy and reformat data when transferring between dissimilar communication devices, thereby placing an additional computational load on the microprocessor.

In light of the above a data transport controller is clearly needed that reduces the interaction between the microprocessor and the devices interfacing therewith, as well as separates the data transport microprocessor program storage memory from the packet data buffer memory such that packets being transferred do not impact the performance of said microprocessor. In addition, it is highly desirable to reduce the frequency of external interrupts, i.e. due to the transfer of data to thus provide the highest possible data transfer by detaching the microprocessor from the minute command and control functions associated with external devices.

SUMMARY OF THE INVENTION

Accordingly, it is one object of the present invention to provide a data transport control apparatus that not only resolves the above stated difficulties but, in addition, is sufficiently versatile to be uniform throughout an entire communication network.

This object is accomplished, at least in part, by a data transport control apparatus having a storage medium that, effectively independently, interfaces with a controller device and a plurality of accessory devices.

Other objects and advantages will become apparent to those skilled in the art from the following detailed description read in conjunction with the appended claims and the drawing attached hereto.

DETAILED DESCRIPTION OF INVENTION

Figure 1:
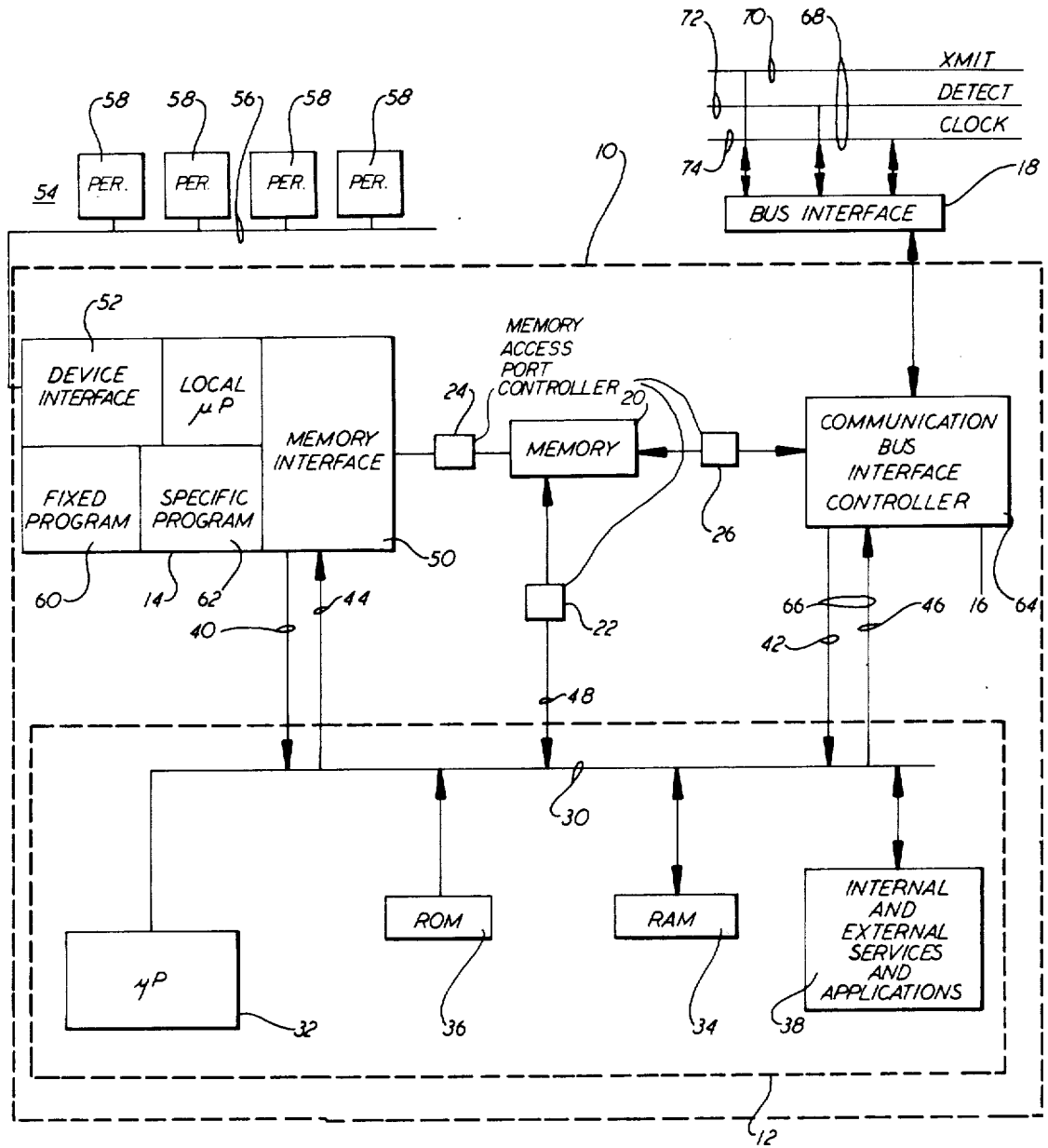
FIG. 1 is a block diagram of a data transport control apparatus embodying the principles of the present invention.

A data transport control apparatus, generally indicated at 10 in FIG. 1 and embodying the principles of the present invention, includes a plurality of data transceivers such as, for example, a microprocessor 12, a device interface controller 14, a means 16 for controlling a communication bus interface 18 and a storage medium 20. The apparatus 10 further includes a first memory port access controller 22 between the microcomputer 12 and the storage medium 20, a second memory port access controller 24 between the device interface controller 14 and the storage medium 20 and a third memory port access controller 26 between the means 16 and the storage medium 20. In addition, the apparatus 10 includes a means 28 for regulating communication between the memory port access controllers, 22, 24 and 26, and the storage medium 20.

In one embodiment, the microprocessor 12 includes a local bus 30 interconnecting a microprocessor portion 32, a dedicated random-access memory (RAM) portion 34, a dedicated read-only-memory (ROM) portion 36 and an auxiliary service portion 38. The microprocessor portion 32 provides all necessary data manipulation services including all instruction set operations with programs stored in memories, 34, 36 and 38. In addition, the microprocessor 12 effectively establishing control over the apparatus 10 by accepting interrupt signals from the device interface controller 14 and the communication bus interface controller 16 via lines 40 and 42 respectively, and generating channel attention signals thereto via lines 44 and 46 respectively. The microcomputer 12 also bidirectionally communicates with the storage medium 20 via line 48. Preferably, the connection, i.e., line 48, between the microcomputer 12 and the storage medium 20 supports interrupt and channel attention signal as well as data exchange therebetween. In one preferred embodiment, the microprocessor portion 32 is an 80186 manufactured and marketed by Intel Corp. of Santa Clara, Calif.

The device interface controller 14 includes a means 50 for interfacing with the storage medium 20, the means 50 also interfaces with the local bus 30 of the microcomputer 12 for providing interrupt signals thereto and receiving channel attention signals therefrom. The device interface controller 14 further includes a means 52 for interfacing with a controllable device 54 via a high speed bus 56 having, for example, a plurality of peripherals 58 connected thereto. Alternatively, the means 50 can also interface with a communication network bus, see, for example, U.S. patent application Ser. No. 705,458, now abandoned, entitled "Device Interface Controller". The means 50 can also interface with another device interface controller, see for example U.S. patent application Ser. No. 705,456, now abandoned, entitled "Apparatus for Interfacing With a Device Controller" both of the above referenced patent applications being filed on even date herewith and assigned to the assignee hereof and are deemed incorporated herein by reference. In the preferred embodiment, as fully discussed in the above-referenced U.S. patent application Ser. No. 705,458, now abandoned, entitled "Device Interface Controller" the device interface controller 14 includes a fixed program portion 60 and a peripheral specific program portion 62. The means 16 for controlling the communication bus interface 18 includes a nodal controller chip 64, such as, for example, an 82586 marketed and manufactured by Intel Corp. of Santa Clara, Calif., although other functionally similar devices can also be used. The means 16 includes means 66 for providing interrupt signals to the microcomputer 12 and receiving channel attention signals therefrom via the local bus 30 of the microcomputer 12. In addition, as more fully discussed below, the means 16 bidirectionally communicates with the storage medium 20. In the preferred embodiment, a communication bus 68, for transporting data between to and from any other data transport control apparatus 10, or the like, includes a data transport medium 70, a collision detection medium 72 that is distinct from the data transport medium 70 and a clock signal medium 74. Such a communication bus 68 and exemplary communication bus interfaces 18 therefore are fully described in U.S. patent applications Ser. Nos. 670,682 and 670,701 both filed on Nov. 13, 1984 and assigned to the assignee hereof, now U.S. Pat. Nos. 4,644,348 and 4,638,311. These patents are hereby deemed incorporated herein by reference.

Figure 2:
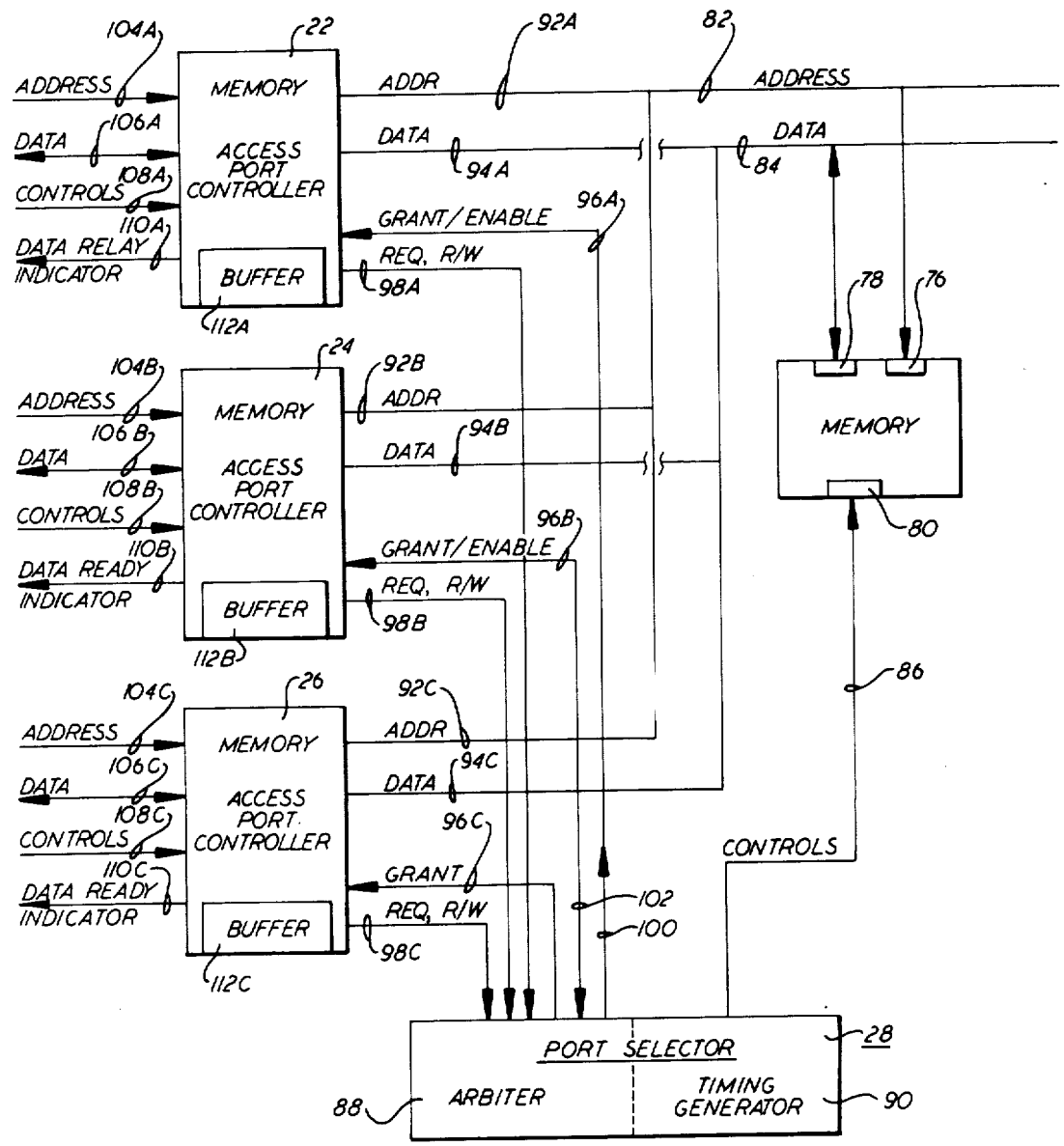
FIG. 2 is a block diagram of a storage medium useful with the apparatus shown in FIG. 1.

As shown in FIG. 2, the storage medium 20 includes an address port 76, a data port 78 and a control signal port 80. Further, a single address bus 82 interconnects the address port 76 with the memory port access controllers, 22, 24 and 26. In addition, a single data bus 84 interconnects the data port 78 with the memory port access controllers, 22, 24 and 26. The means 28 interconnects with the storage medium 20 via a control signal bus 86 connecting to the control signal port 80.

In the preferred embodiment, the storage medium 20 is a random-access-memory (RAM) having a storage capacity of about 32 Kbytes. Many available RAM devices could be used, such as, an HM6262-LP manufactured and marketed by Hitachi Corp., Japan. One typical means 28 for regulating communication between the storage medium 20 and the port access controllers, 22, 24, and 26, includes an arbiter 88 and an associated timing generator 90. The arbiter 88 is adapted, in a conventional manner, to poll each port access controller 22, 24 and 26, and respond to any read/write requests therefrom. The timing generator 90 can be any conventional means for producing clocking signals to the arbiter 88. In fact, the timing generator 90 can, in actual implementation, be a signal derived from any clocking signal available, such as, from a master clock associated with the clocking bus 74.

In the preferred embodiment, the port access controllers, 22, 24 and 26, are identical and include, on the storage medium sides thereof, address ports, 91A, B and C, data ports, 94A, B and C, grant/enable ports, 96A, B and C and read/write request ports 98A, B and C. The address ports 92A, B and C communicate with the storage medium 20 via the address bus 82. The data ports 94A, B and C, communicate with the storage medium 20 via the data bus 84. The grant/enable ports, 96A, B and C, receive signals from the means 28 via a grant/enable line 100 whereas the read/write request ports, 98A, B and C, provide signals to the means 28 via a read/- write request line 102. In addition, the port access controllers, 22, 24 and 26, include, on the controller sides thereof, address ports, 104A, B and C, data ports, 106A, B and C, control signal ports 108A, B and C and, preferably, data ready indicator ports, 110A, B and C. For reasons more fully discussed below, the port access controllers, 22, 24 and 26 are each provided with a buffer, 112A, B and C.

In operation, the means 28, continuously polls, in sequence, each port access controller 22, 24 and 26 to detect the presence of read/write requests therefrom. If no such requests are present the means 28 continues the polling without interfering with the ongoing operation of the apparatus 10. When a read/write request is detected, for example, from the means 16, via port access controller 26, and if no other port access controller, 22 or 24, has previously accessed the storage medium 20, a grant/enable signal is provided to the port access controller 26 by the means 28. Upon receipt of such a grant/enable signal, the port access controller 26 presents an address to the storage medium 20 via address port 76 and begins reading, or writing, data from, or into respectively, the storage medium 20. The means 28, nevertheless, continues polling all other port access controllers, 22 and 24.

If, and when, a second read/write request signal is detected by the means 28, from, for example, the device interface controller 14 via port access controller 24, access to the storage medium 20 is alternated between the port access controllers, 24 and 26, via alternating grant/enable signals thereto. Nevertheless, the means 28 continues polling the port access controller 22. Similarly, if and when, a third read/write request signal from the microcomputer 12 via port access controller 22, is detected, access to the storage medium 20 is sequenced among the port access controllers, 22, 24 and 25, via sequencing the grant/enable signals thereto. In such sequencing one, and only one, port access controller, 22, 24 and 26, communicates with the storage medium 20 at any given time. That is, for all intents and purposes, the port access controllers 22, 24 and 26, are isolated and independent of each other.

The means 28 is preferably designed to stepwise, in the instance that two or more port access controllers simultaneously indicate a preference to access the storage medium 20, allow access by each during consecutive time intervals, each port access controller, 22, 24 or 26 being thus guaranteed a predetermined maximum access time to the storage medium 20. Thus, the port access controller, 22, 24 and 26, are, for all intents and purposes, substantially completely isolated from each other. Therefore, communication between any given port access controller, 22, 24, or 26, and the storage medium 20 is of no consequence to communication between the storage medium 20 and any other port access controller, 22, 24 or 26.

In the preferred embodiment, because communication with the storage medium 20 is neither continuous nor always without delay, the buffers, 112A, B and C, temporarily retains information until access is awarded thereto via the time cycle of the means 28. The polling time cycle is preferably selected such that each port access controller 22, 24 and 26, has access to the storage medium 20 in a consecutive fashion, should more than one request be made simultaneously. The retention of information in the port access controller buffers 112A, B, and C, thus ensures that no significant delays or data losses occur.

The speed of the storage memory 20 and the means 28 guarantee a particular worst case maximum response time to any read/write request. Hence, the actual request time depends upon both the instantaneous port access controller servicing status and the number of pending requests. The means 28 is designed to cycle sufficiently rapidly, i.e., about 6 MHz, so that, in effect, each port access controller, 22, 24, and 26, connected thereto is uneffected by the use of the storage medium 20 by the other two port access controllers connected thereto. The actual detailed design of the means 28 is achieved using known techniques.

The apparatus 10 described herein thus results in a rapid flow of data between, for example, a given peripheral 58 and the communication bus 68. This speed is derived from the fact that data is never internally copied or transferred and that data transfers occur only between the storage medium 20 and the intended destination of the data. That is, only interrupt and channel attention signals are exchanged between the device interface controller 14 or the communications bus controlling means 16 and the microcomputer device 12. Consequently, the microcomputer 12 does not copy the data whatsoever, i.e. from memory to memory, thus saving time. Specifically, the microcomputer 12 does not copy, or recopy, the data, unless, of course, the microcomputer 12 is, in fact, the destination, for that data; for example, when computation on the data is required.

Hence, in order to transport the data from the communication bus 68 to a peripheral 58, or vice versa, the microcomputer 12 exercises the minimum amount of control over the address information and, in the worse case, attaches additional control or address information thereto. In this manner, the actual data is never copied in the present apparatus. Thus, for all intents and purposes, and, contrary to previous communication system designs, the microcomputer 12 is effectively removed, but for providing location information, from the path between the communication bus 68 and the peripheral 58 involved in a data transfer. As a consequence, data is transported more rapidly between source and destination.

The present data transport control apparatus 10 can be used as a single uniform building block for an entire communication subsystem wherein the apparatus 10 allows the modular expansion of a communication subsystem with maximized distribution of control and a minimized difficulty and expense for expansion. One such communication subsystem is fully discussed in U.S. patent application Ser. No. 705,464 entitled "Communication Subsystem" filed on even date herewith, now U.S. Pat. No. 4,653,047, to the assignee hereof.

Although the present invention has been described herein by an exemplary embodiment, it is understood that other arrangements or configurations may be implemented that do not depart from the spirit and scope hereof. Hence, the present invention is deemed limited only by the attached claims and the reasonable interpretation thereof.

What is claimed is:

1. A data transport control apparatus employing a microprocessor for processing data to be transported to an external peripheral device, coupled to a data bus as well as to a communications bus via a bus interface, comprising:

a memory having a data port, an address port and a control signal port;

a device interface controller coupled to said data bus and operative to transfer data to said peripheral device thereon, said interface controller having an interface output port for interfacing with said memory and having output means for interfacing with said microprocessor;

a communication bus interface controller coupled to said communications bus interface and operative to transfer data thereto, said communication bus interface having an interface output port for interfacing with said memory and having output means for interfacing with said microprocessor;

a microprocessor bus coupled to said microprocessor and coupled to said output means of both said device interface controller and said communication bus interface controller to enable interrupt signals as well as attention signals to be transmitted between said controllers and said microprocessor;

first, second and third memory access port controllers each having a single address bus coupled to said address port of said memory, and each having a single data bus coupled to said data port of said memory with said first access port controller coupled to said interface output port of said device interface controller, with said second access port controller coupled to said interface output port of said communication bus interface controller and with said third access port controller coupled to said microprocessor bus wherein each memory access port controller couples its respective coupled device to said memory and port selection means coupled to said access port controllers and coupled to said memory control signal port and operative to poll each access port controller in sequence to determine a service request to enable access to said memory by any one of said port controllers during a given time interval, whereby said device interface controller, said communication bus interface controller and said microprocessor are guaranteed a predetermined maximum access time to said memory.

2. The apparatus according to claim 1 wherein said output means for interfacing with said memory of said device and communication interface controllers includes an interrupt signal line and a channel attention signal line.

3. The apparatus according to claim 1 wherein each of said memory access port controllers interface with said memory to allow bidirectional coupling of data.

4. The apparatus according to claim 1 further including a dedicated ROM coupled to said microprocessor bus.

5. The apparatus according to claim 1 further including a dedicated RAM coupled to said microprocessor bus.

6. The apparatus according to claim 1 further including an interface and external service memory coupled to said microprocessor bus.

7. The apparatus according to claim 1 wherein said port selection means includes an arbiter means coupled to said memory access port controllers and operative to respond to service requests therefrom, and timing means coupled to said arbiter means for providing timing signals to said arbiter means for generating said given timing intervals.

8. The apparatus according to claim 1 wherein said first, second and third memory access port controllers are identical devices each including on the memory coupling side an address port, a data port, a grant/enable port and a read/write request port.

9. The apparatus according to claim 1 wherein the first, second and third memory access port controllers each include a storage buffer operative to temporarily store information until access is afforded to said memory.

10. The apparatus according to claim 1 wherein said polling of all of said memory access port controllers occurs at about a 6 MHZ rate.

* * * * *